United States Patent
Embree et al.

(10) Patent No.: US 6,169,762 B1
(45) Date of Patent: *Jan. 2, 2001

(54) INTERFACE DEVICES PROVIDING ELECTRICAL ISOLATION

(75) Inventors: Milton L. Embree, Reading; Jonathan H. Fischer, Blandon; Donald R. Laturell, Allentown; Robert F. Lee, Wyomissing, all of PA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/866,510

(22) Filed: May 30, 1997

(51) Int. Cl.[7] ................ H04B 1/38; H04B 3/00
(52) U.S. Cl. .................................................. 375/220
(58) Field of Search .................... 375/222, 219, 375/257, 258, 220; 379/93.01, 93.05, 399, 412

(56) References Cited

U.S. PATENT DOCUMENTS

| | | | |
|---|---|---|---|
| 4,056,719 | 11/1977 | Hizel | 359/161 |
| 4,331,842 | 5/1982 | Kiko | 375/345 |
| 4,373,117 | 2/1983 | Pierce | 375/93.36 |
| 4,395,590 | 7/1983 | Pierce et al. | 375/93.36 |
| 4,417,099 | 11/1983 | Pierce | 375/93.36 |
| 4,479,066 | 10/1984 | Embree | 327/361 |
| 4,491,700 | 1/1985 | Tahara et al. | 379/405 |
| 4,500,754 | 2/1985 | Mackey | 379/398 |
| 4,514,595 | 4/1985 | Rosenbaum et al. | 379/385 |
| 4,578,533 | 3/1986 | Pierce | 379/93.31 |
| 4,592,069 | 5/1986 | Redding | 375/222 |
| 4,715,064 | 12/1987 | Claessen | 379/392 |
| 4,807,283 | 2/1989 | Pyhälammi | 379/404 |
| 4,989,243 | 1/1991 | Choi | 379/402 |
| 5,029,203 | 7/1991 | Ikefuji et al. | 379/391 |
| 5,086,454 | * 2/1992 | Hizel | 375/222 |
| 5,218,616 | * 6/1993 | Stephens | 379/27 |
| 5,224,154 | 6/1993 | Aldridge et al. | 379/93.36 |
| 5,245,654 | 9/1993 | Wilkison et al. | 379/405 |
| 5,280,526 | 1/1994 | Laturell | 379/405 |
| 5,369,687 | 11/1994 | Farkas | 379/93.36 |
| 5,500,894 | * 3/1996 | Hershbarger | 379/405 |
| 5,654,984 | * 8/1997 | Hershbarger | 375/257 |

OTHER PUBLICATIONS

"A Linear CMOS OTA for VHF Applications", by Stanislaw Szczepanski et al., 1995 IEEE International Symposium on Circuits and Systems, Seattle, Washington, Apr. 30–May 3, 1995, pp. 1344–1347.

"ATTD2560ABL Interface Circuit for Optically Couled Data Access Arrangements", AT&T Microelectronics, Advance Data Sheet, Apr. 1994, pp. 1–12.

"Evaluation Board for CS4303", Crystal Semiconductor Corporation CDB4303, May 1993 DS81DB2, pp. 2–19 to 2–30.

"Digital Audio Interface Receiver", Crystal Semiconductor Corporation CS8411 CS8412, Nov. 1993 DS61PP4, pp. 6–35 to 6–68.

"107 dB, D/A Converter for Digital Audio", Crystal Semiconductor Corporation CS4303, Aug. 1993 DS81PP2, pp. 2–3 to 2–18.

* cited by examiner

Primary Examiner—Tesfaldet Bocure
(74) Attorney, Agent, or Firm—Steve Mendelsohn

(57) ABSTRACT

Embodiments of the present invention are directed to interface devices that provide an interface between a first device and a second device, where the interface device provides electrical isolation between the first device and the second device, and where codec processing is distributed between the first-device side and the second-device side of the interface device. In a preferred embodiment, the second device has a transmission line, the interface device is a modem, and the electrical isolation is provided by one or more digital couplers that transmit sigma-delta signals that are coded and decoded in both the first-device-side and second-device-side circuitries of the modem.

32 Claims, 4 Drawing Sheets

INTERFACE DEVICES PROVIDING ELECTRICAL ISOLATION

BACKGROUND OF THE INVENTION

This application is related to U.S. Pat. Nos. 5,528,685 and 5,528,686, both issued on Jun. 18, 1996, the teachings of both of which are incorporated herein by reference.

FIELD OF THE INVENTION

The invention relates to interface devices such as those used for telephony applications like modems and the like, and, more particularly, to such devices that require electrical isolation.

DESCRIPTION OF THE RELATED ART

The U.S. Federal Communications Commission (FCC) and counterpart regulatory agencies in other countries require telephone equipment to meet stringent requirements in order to protect the telephone lines from damage and degradation. Under one such requirement, telephone equipment must be electrically isolated from the telephone lines. Although the required electrical isolation varies by country, it is invariably demanding. For example, the U.S. requires 1500-volt isolation and other countries require up to 4000-volt isolation. As a result, telephone equipment must include some form of electrical isolation circuitry to prevent the telephone equipment from applying voltage surges or ground connections to the telephone lines, and vice versa.

FIG. 1 shows a block diagram of a conventional modulator/demodulator (modem) 100, which is an interface device typically placed between a telephone line (i.e., the line side) and a user device, such as a data terminal or a computer (i.e., the device side). Modem 100 comprises data pump 102, coder/decoder (codec) 104, and data access arrangement (DAA) 106. In conventional modems, the DAA provides the interface to analog phone lines and the data pump provides the interface to digital computer buses. The codec operates as an analog-to-digital (A/D) converter for incoming signals in the receive path (i.e., signals traveling from the line side to the device side) and a digital-to-analog (D/A) converter for outgoing signals in the transmit path (i.e., signals traveling from the device side to the line side). That is, the codec converts (1) the incoming analog signals received from the phone lines into digital signals for transmission to the computer and (2) the outgoing digital signals received from the computer into analog signals for transmission over the phone lines. As such, in conventional modems, the DAA comprises circuitry to process analog signals, while the data pump comprises circuitry to process digital signals. Data-pump processing involves (1) the digital-to-digital conversion of computer data streams into a narrow-bandwidth signaling pattern format suitable for application to the input of a D/A converter compatible with voice-band telephone lines and (2) the digital-to-digital conversion of such narrow-band data back into computer data streams.

In particular, in conventional modems, the DAA contains one or more of the following types of analog circuitry:
- Electrical protection and high-voltage isolation circuitry to protect the phone lines and/or the computer (as well as the user) from high-voltage transients;
- Line termination circuits to meet regulatory return loss requirements;
- Transmit amplifier circuitry for controlling transmitted signal power for the outgoing analog signals and receive amplifier circuitry for controlling signal power in the receive path for the incoming analog signals; and
- Two-wire-to-four-wire conversion circuitry for converting between the two-wire TIP/RING signals for the telephone line and the four-wire (RX+, RX−, TX+, and TX−) signals for the computer.

Depending on the sophistication of the circuitry, the DAA will contribute more or less degradation to the signals. For example, using large transformers in the DAA would provide a signal path with very little degradation, but using such transformers would be impractical for portable applications because of the size and weight.

In some conventional modems, an isolation transformer is used in the DAA to provide electrical isolation between the telephone lines and the computer. Transformers, however, suffer from excessive bulk and weight relative to most solid-state devices. Transformers are particularly cumbersome when used in modems designed for portable computers and other portable applications. In addition, transformers are relatively expensive, and pose reliability problems due to their mass when subject to mechanical shock or vibration.

What is needed is a scheme for providing low-degradation electrical isolation in modems that do not rely on transformers.

SUMMARY OF THE INVENTION

Embodiments of the present invention are directed to an interface device for interfacing between a first device and a second device. The interface device comprises (a) first-device-side circuitry, adapted to interface to the first device and to provide first-device-side codec processing; (b) second-device-side circuitry, adapted to interface to the second device and to provide second-device-side codec processing; and (c) a digital interface, connected between the first-device-side circuitry and the second-device-side circuitry and adapted to provide electrical isolation between the first device and the second device. The first-device-side circuitry and the second-device-side circuitry are adapted to apply sigma-delta modulation techniques to generate digital signals for transmission through the digital interface.

Alternative embodiments of the present invention are directed to analog front end (AFE) circuitry for an interface device for interfacing between a first device and a second device. The AFE circuitry forms second-device-side circuitry of the interface device which is adapted to interface to the second device and to provide second-device-side codec processing. The interface device further comprises first-device-side circuitry, adapted to interface to the first device and to provide first-device-side codec processing, and a digital interface, connected between the first-device-side circuitry and the second-device-side circuitry and adapted to provide electrical isolation between the first device and the second device. The first-device-side circuitry and the second-device-side circuitry are adapted to apply sigma-delta modulation techniques to generate digital signals for transmission through the digital interface.

Further alternative embodiments of the present invention are directed to an interface device for interfacing between a first device and a second device. The interface device comprises (a) first-device-side circuitry, adapted to interface to the first device; and (b) second-device-side circuitry, adapted to interface to the second device and to the first-device-side circuitry. The second-device-side circuitry comprises (1) an AC termination impedance, adapted to provide impedance for transmission-line AC requirements; (2) an inductor emulator, adapted to provide DC termination for the second device; and (3) a shunt regulator, adapted to control voltage levels seen by the second-device-side circuitry. The inductor emulator is connected in series with the shunt regulator.

Still further alternative embodiments of the present invention are directed to analog front end circuitry for an interface device for interfacing between a first device and a second device. The AFE circuitry comprises (1) an AC termination impedance, adapted to provide impedance for transmission-line AC requirements; (2) an inductor emulator, adapted to provide DC termination for the second device; and (3) a shunt regulator, adapted to control voltage levels seen by the AFE circuitry. The inductor emulator is connected in series with the shunt regulator.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Embodiments of the present invention are directed to interface devices that provide an interface between a telephony device and an analog telephone line, where the interface device provides electrical isolation between the telephony device and the telephone line, and where codec processing is distributed between the device side and the line side of the interface device. In a preferred embodiment, the interface device is a modem, and the electrical isolation is provided by one or more digital couplers that transmit sigma-delta modulated signals that are coded and decoded in both the device-side and line-side circuitries of the modem.

Figure 1:
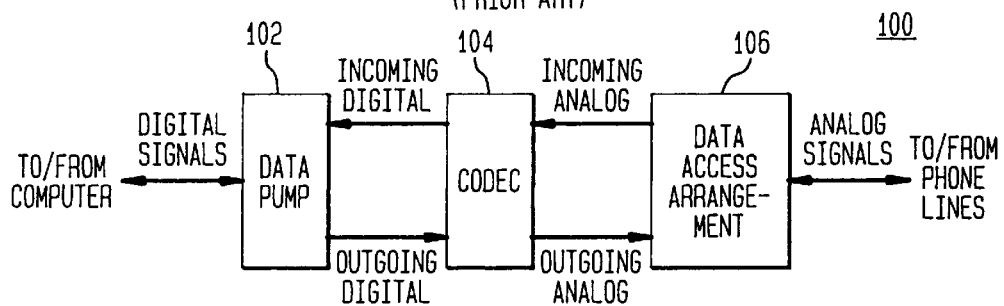
FIG. 1 shows a block diagram of a conventional modem.
Figure 2:
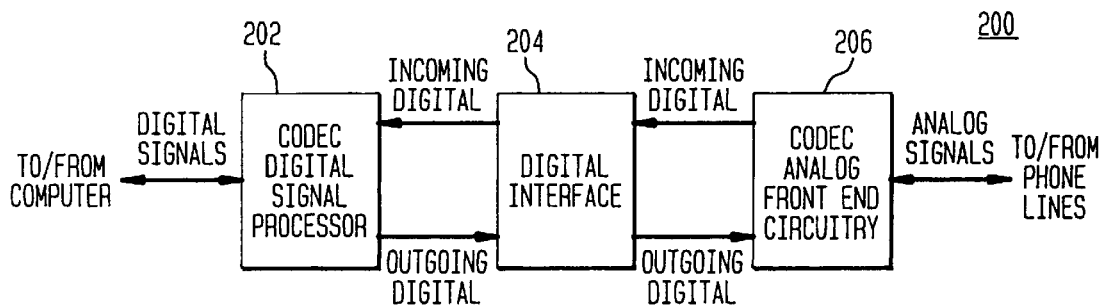
FIG. 2 shows a block diagram of a modem, according to one embodiment of the present invention.

FIG. 2 shows a block diagram of a modem 200, according to one embodiment of the present invention. In modem 200, digital and analog processing, analogous to that performed in codec 104 of conventional modem 100 of FIG. 1, is distributed between the device side (i.e., codec digital signal processor (DSP) 202) and the line side (i.e., codec analog front end (AFE) circuitry 206).

AFE circuitry 206 performs the DAA processing of DAA 106 of modem 100 in addition to codec analog processing. In one implementation, DSP 202 performs the data-pump processing of data pump 102 of modem 100 of FIG. 1 in addition to codec digital processing. In an alternative implementation, the data-pump processing is implemented in software. In that case, the codec digital processing can be implemented in a dedicated DSP like DSP 202 or combined with other DSP-based processing, such as in an audio processing circuit.

Digital interface 204 forms the interface between DSP 202 and AFE circuitry 206. Digital interface 204 provides electrical isolation between the line side and the device side of modem 200. In conventional modems, such as modem 100 of FIG. 1, the electrical isolation function is implemented in analog circuitry within the DAA, typically using a transformer with primary and secondary coils separated by a dielectric that protects the secondary coils from high voltage in the primary coils. In embodiments of the present invention, however, instead of using a transformer, the electrical isolation function is implemented in the digital domain using one or more digital couplers, such as digital optical couplers or capacitive couplers.

A digital optical coupler has a transmitter and a detector (i.e., receiver). The transmitter converts digital electrical signals into optical signals and transmits those optical signals to the detector. The detector receives the optical signals from the transmitter and converts those optical signals back into digital electrical signals. Dielectric between the transmitter and the detector provides the electrical isolation protection. A capacitive coupler, as taught in U.S. Pat. No. 5,187,637, incorporated herein by reference, uses one or more capacitors to employ a similar signaling technique as is used in optical couplers.

Whether modem 200 is implemented using digital optical couplers or capacitive couplers, digital interface 204 preferably has only three couplers: two for the transmit path and one for the receive path. In the transmit path, one coupler is used for the outgoing data signals and one coupler is used for the clock signals. In the receive path, a single coupler is used for the incoming data signals.

In a preferred embodiment of modem 200, the digital signals are modulated using sigma-delta modulation with two-level feedback for transmission through digital interface 204. Sigma-delta modulation is a standard signal processing technology. See, e.g., *Oversampling Delta-Sigma Data Converters: Theory, Design, and Simulation,* edited by James C. Candy and Gabor C. Temes (IEEE Press, 1992), and *Delta-Sigma Data Converters: Theory, Design, and Simulation,* edited by Steven R. Norsworthy, Richard Schreier, and Gabor C. Temes (EEE Press, 1997), the teachings of both of which are incorporated herein by reference.

In the receive path, incoming analog TIP and RING signals are received by AFE circuitry 206 from the phone lines. AFE circuitry 206 applies analog codec processing to convert the analog input signals into a 1-bit representation that has a sample rate typically 64 to 256 times the Nyquist rate needed to encode the input signal. The resultant 1-bit wide words are well suited for transmission through high-voltage couplers. The 1-bit signal stream is transmitted through digital interface 204 to DSP 202. DSP 202 applies codec digital processing to filter the incoming digital signal to remove the quantization noise and spurious noise and/or signals that fall outside the modem signal band. DSP 202 then transmits the resulting incoming digital signals to the computer.

In the transmit path, outgoing digital signals are received by DSP 202 from, for example, a computer. DSP 202 applies conventional data-pump digital processing to the outgoing digital signals. In addition, DSP 202 applies codec digital processing to convert the outgoing digital signals into a 1-bit signal stream using digital sigma-delta modulation techniques. The 1-bit signal stream is transmitted through digital interface 204 to AFE circuitry 206, which applies analog codec processing to drive a simple 1-bit D/A converter with the received 1-bit stream and use analog filters to remove the out-of-band noise. AFE circuitry 206 transmits the resulting outgoing analog TIP and RING signals to the phone lines, where the conventional definition of phone lines refers to TIP and RING.

Using 1-bit A/D and D/A codes allows modem 200 to be implemented with only three couplers (one for incoming data, one for outgoing data, and one for outgoing clock). Furthermore, since the data words are only 1-bit wide, no synchronization signal is needed to send data.

As described above, in embodiments of the present invention, the analog and digital functions of a conventional modem codec are separated and distributed between the line side and the device side of the modem. The greater the amount of codec functionality that is performed on the device side in the digital domain, the smaller will be the power consumption of the line-powered portion of the modem.

Figure 3:
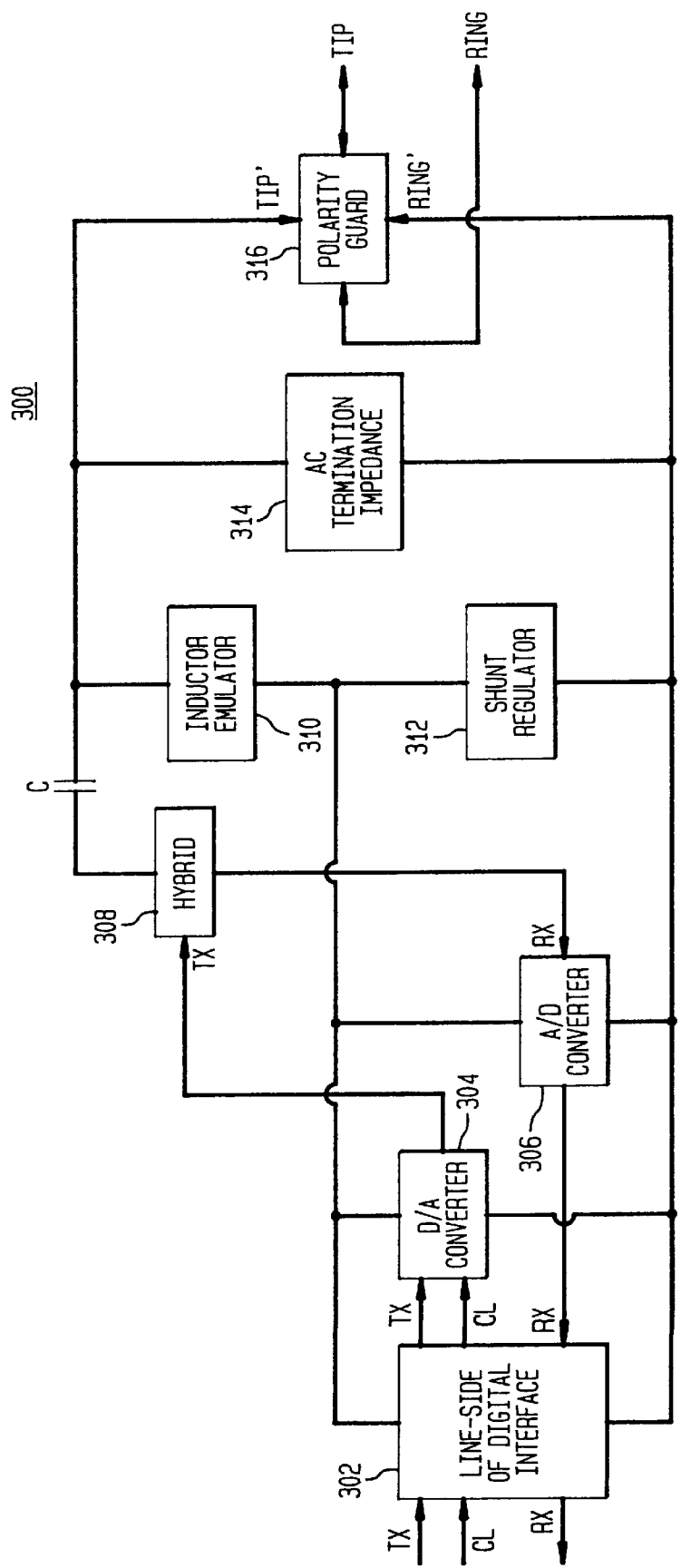
FIG. 3 shows a block diagram of the line-side circuitry of the modem of FIG. 2.

FIG. 3 shows a block diagram of the line-side circuitry 300 of modem 200 of FIG. 2, according to one embodiment of the present invention. Circuitry 300 includes the line side 302 of digital interface 204 of FIG. 2 as well as AFE circuitry 206 of FIG. 2. Line-side circuitry 300 processes outgoing signals for transmission over the TIP and RING phone lines. In addition, line-side circuitry 300 processes incoming signals received from the phone lines.

In particular, line-side digital interface 302 receives the outgoing data and clock signals transmitted from DSP 202 through digital interface 204 of FIG. 2. When digital interface 204 is implemented using digital optical couplers, line-side digital interface 302 has two optical detectors for receiving and converting the optical signals corresponding to the outgoing data and clock signals back into 1-bit sigma-delta streams. When digital interface 200 is implemented using capacitive couplers, line-side digital interface 302 uses capacitors and associated circuitry to receive and convert the signals corresponding to the outgoing data and clock signals back into 1-bit sigma-delta streams. In either case, the received digital signals are passed to D/A converter 304 which applies sigma-delta decoding to convert the signals into an analog signal corresponding to the outgoing data signal. This analog signal is input to hybrid 308.

In line-side circuitry 300, inductor emulator 310 is connected in series with shunt regulator 312 between the TIP' and RING' lines, and that series combination is connected in parallel with both AC termination impedance 314 and polarity guard 316. This circuitry operates to control the TIP and RING signals that flow over the phone lines. AC termination impedance 314 provides the appropriate impedance for phone-line AC requirements. Polarity guard 316 ensures that the correct polarity DC voltage is applied to the AFE circuitry.

Inductor emulator 310 provides an appropriate DC termination for proper signaling to the central office. Inductor emulator 310 is preferably implemented with active circuitry that emulates passive hardware to provide a large effective inductance in series with a finite DC resistance that is specified by regulatory agencies. Since inductor emulator 310 is in parallel with AC termination impedance 314, the equivalent inductance of inductor emulator 310 must be high enough not to interfere with the functionality of AC termination impedance 314.

In a preferred implementation, line-side circuitry 300 is primarily embodied in a single CMOS integrated circuit (IC) that is powered exclusively by the phone lines. Since CMOS devices can tolerate voltages of limited magnitude (e.g., 5 volts), shunt regulator 312 is provided to protect line-side circuitry 300 from line voltages greater than the CMOS limit. Line voltages are typically much higher than 5 volts.

Shunt regulator 312 acts as a variable resistor to control the voltage seen by line-side circuitry 300. An appropriate design for shunt regulator 312 has an adjustable DC impedance and preferably a very low AC impedance. Shunt regulator 312 may be implemented with sensing circuitry that senses the voltage between the top and bottom nodes of the regulator and control circuitry that causes the shunt regulator to operate as a variable resistor that responds to the sensed voltage to maintain a constant voltage between those nodes.

In the implementation of line-side circuitry 300 shown in FIG. 3, inductor emulator 310 is placed in series (and not in parallel) with shunt regulator 312. This design avoids additional power consumption that would otherwise result if the inductor emulator were placed in parallel with the shunt regulator. This helps achieve the goal of designing line-side circuitry that is to rely solely on the phone lines for its power by maximizing the total available power to the analog front end.

Taking the RING' line as a point of reference, hybrid 308 with capacitor C samples the TIP' signals, and hybrid 308 also samples the analog signals transmitted from D/A converter 304, which are representative of the outgoing signals. Hybrid 308 essentially subtracts the sampled outgoing signals from the sampled TIP' signals to generate analog signals that are replicas of the incoming signals. A/D converter 306 applies sigmal-delta encoding to convert the analog signals into a 1-bit stream for transmission by line-side digital interface 302. When digital interface 204 of FIG. 2 is implemented using digital optical couplers, line-side digital interface 302 has one optical transmitter for converting the 1-bit stream generated by A/D converter 306 into optical signals for transmission to the device-side of digital interface 204. When digital interface 204 of FIG. 2 is implemented using capacitive couplers, line-side digital interface 302 uses capacitors and associated circuitry to convert the 1-bit stream generated by A/D converter 306 into signals for transmission to the device-side of digital interface 204.

As described above, when digital interface 204 of FIG. 2 is implemented using optical couplers, line-side digital interface 302 has two optical detectors and one optical transmitter. One of the optical detectors receives the optical signals transmitted from the device side of digital interface 204 that correspond to the outgoing data signals, and the other optical detector receives the optical signals corresponding to the clock signals. The optical transmitter generates optical signals corresponding to the incoming data signals for transmission to the device side of digital interface 204.

Figure 4:
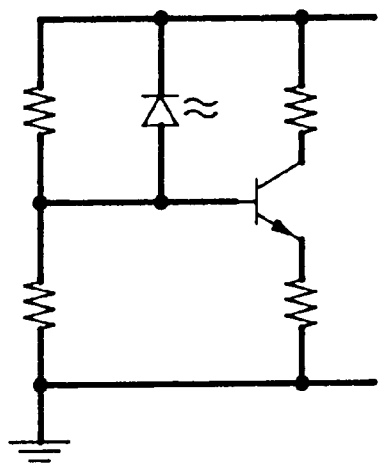
FIG. 4 shows a schematic diagram of each of the two optical detectors of the line-side digital interface of the modem of FIG. 2.

FIG. 4 shows a schematic diagram of each of the two optical detectors of line-side digital interface 302, according to one embodiment of the present invention. In FIG. 4, the detector is implemented using a photosensitive PIN diode, an amplifier, and biasing circuitry adapted to reverse bias the photo-diode and to ensure that the amplifier avoids both cut-off and saturation conditions. The biasing of the photodiode and the amplifier keeps capacitance to a minimum and optimizes the speed and power consumption of the detector. In one preferred embodiment of modem 200, the optical detector in the device-side of digital interface 204 of FIG. 2 has the same design as the optical detector of FIG. 4.

Figure 5:
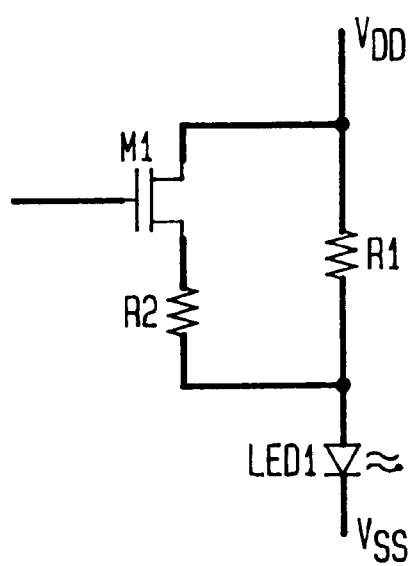
FIG. 5 shows a schematic diagram of the optical transmitter of line-side digital interface of the modem of FIG. 2.

FIG. 5 shows a schematic diagram of the optical transmitter of line-side digital interface 302 of FIG. 3, according to one embodiment of the present invention. In FIG. 5, resistor R1 keeps light emitting diode LED1 idling on, but not full on (e.g., to a minimal photon emitter state) to maximize opto speed. A logic 1 is transmitted when device M1 closes (i.e., turns on). In one preferred embodiment of modem 200, the two optical transmitters in the device-side of digital interface 204 of FIG. 2 each have the same design as the optical transmitter of FIG. 5.

Figure 6:
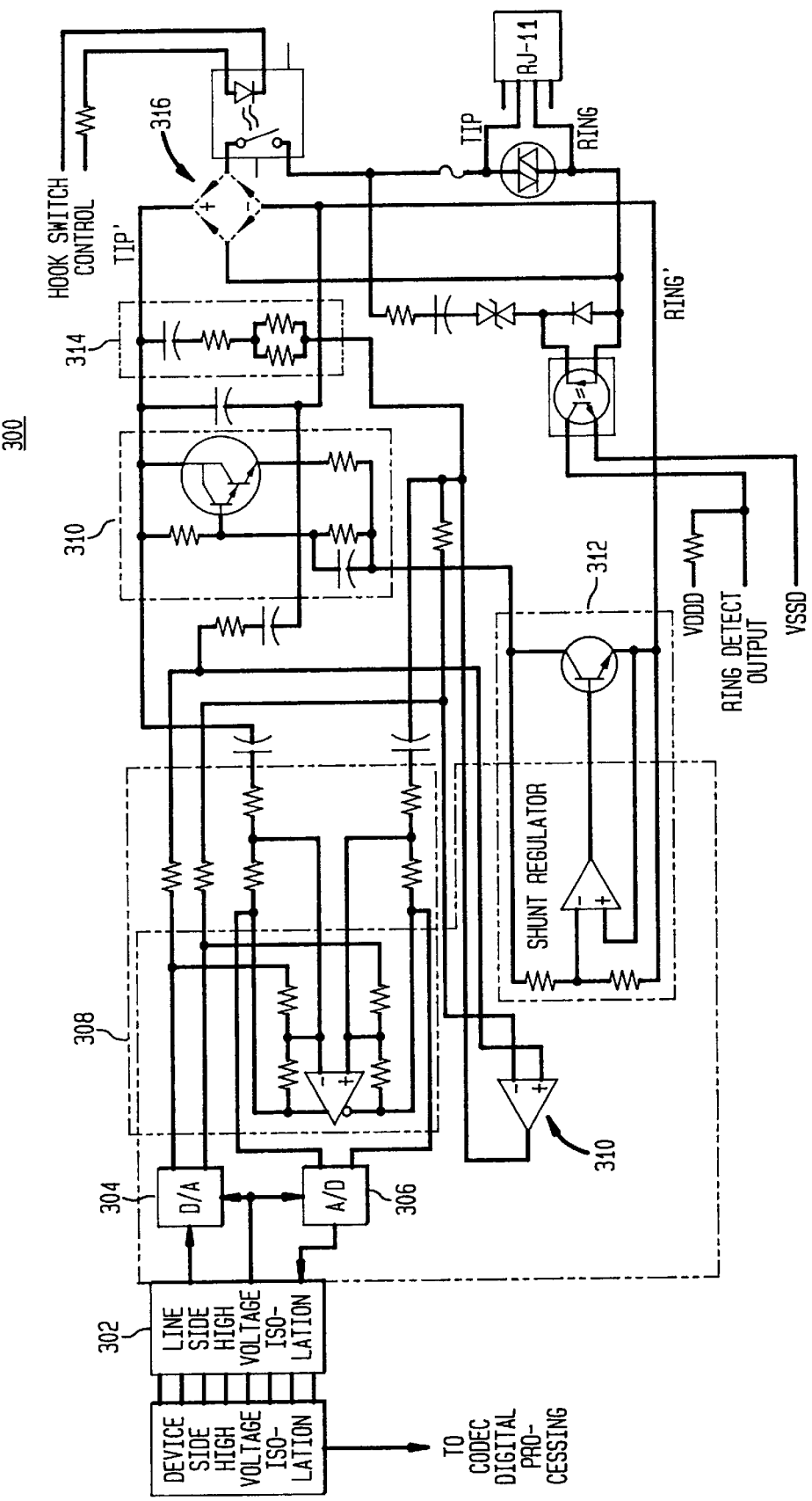
FIG. 6 shows a schematic diagram of the line-side circuitry of FIG. 3.

FIG. 6 shows a schematic diagram of line-side circuitry 300 of FIG. 3, according to one implementation of the present invention. Corresponding functional blocks from FIG. 3 are identified in FIG. 6. Those skilled in the art will understand that some or all of the components of line-side circuitry 300 of FIGS. 3 and 6 may be implemented as a single integrated-circuit (IC) chip, while the remaining components are implemented "off chip." For example, using conventional CMOS technology, D/A converter 304, A/D converter 306, and hybrid 308, as well as portions of line-side digital interface 302, inductor emulator 310, and shunt regulator 312 may be implemented as a single CMOS device, while the remaining components are implemented off chip. It may also be possible to implement all of line-side circuitry 300 (with the possible exception of AC termination impedance 314) as a single integrated circuit using a high-voltage, high-power MOS process, such as DMOS or BCD-MOS technology. In any case, in preferred embodiments of the present invention, line-side circuitry 300 is powered solely by the phone lines.

The present invention provides advantages over the prior art. In the prior art, electrical isolation is provided in the analog domain using transformers. Since signal degradation is inversely proportional to the size of the transformer, such transformers are not practical for many portable applications. Transformers that are small enough for portable applications cause too much signal degradation, while transformers that keep degradation to an acceptable level are too big for many portable applications.

The present invention avoids these limitations of the prior art. By implementing electrical isolation in the digital domain using digital couplers, the present invention avoids the use of small transformers with poor linearity as well as bulky transformers. Moreover, in addition to size, weight, and performance advantages, embodiments of the present invention can be built at a lower cost than comparable prior-art embodiments. It should be emphasized, however, that the present invention is not limited to portable applications. The present invention can also be implemented in non-portable telephony applications that require electrical isolation between telephony devices and phone lines (e.g., desktop computers connected to phone lines via modems).

Furthermore, because of its low power consumption, the line-side circuitry of a modem implemented under the present invention can be (but does not necessarily have to be) powered entirely by the phone lines. In addition, such line-side circuitry can be (but does not necessarily have to be) implemented in a single IC chip, such as a CMOS device.

In FIGS. 1–6, the present invention is shown in the context of a modem. Those skilled in the art will understand that the present invention can alternatively be implemented in other suitable types of telephony hardware that need to provide electrical isolation, such as fax machines, telephone answering machines, speaker-phones, high-end feature phones, and even central office circuits. Moreover, the present invention can be implemented in applications other than telephony-based applications. For example, the present invention could be implemented in the context of an automobile control and sensing system which has a relatively hostile interface problem. In principle, the present invention can be applied to interface circuitry designed to provide electrical isolation in any suitable situation that requires such isolation between two devices. In telephony-based applications, one of the two devices comprises a transmission line, such as a telephone line. In other applications, the transmission line can be a cable, such as a computer cable for a computer network (e.g., LAN).

Similarly, in FIGS. 1–6, the present invention is shown as an interface device between analog phone lines and a digital device, such as a computer or data terminal. It will be understood that the present invention can alternatively be implemented as an interface device between analog phone lines and an analog device. In that case, both the line side and the device side contain A/D converters that convert analog signals into digital signals for transmission through the high-voltage digital interface as well as D/A converters that convert the digital signals transmitted through the high-voltage digital interface back into analog signals.

The embodiments of the present invention described in relation to FIGS. 1–6 rely on sigma-delta modulation techniques to generate digital data for transmission through the high-voltage digital interface. Sigma-delta modulation is particularly suitable for generating the 1-bit data streams that are transmitted through the digital interface. Using 1-bit data streams minimizes the number of couplers (e.g., optical couplers) required in the digital interface, thereby keeping the size and power characteristics of the digital interface to acceptable levels. Those skilled in the art will understand that coding techniques other than sigma-delta modulation can be used to generate 1-bit data streams, such as (but not necessarily limited to) pulse-width modulation and successive approximation schemes. It will also be understood that there may be applications of the present invention that do not require 1-bit data streams.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An interface device for interfacing between a first device and a second device, comprising:
   (a) first-device-side circuitry, adapted to interface to the first device and to provide first-device-side codec processing;
   (b) second-device-side circuitry, adapted to interface to the second device and to provide second-device-side codec processing; and
   (c) a digital interface, connected between the first-device-side circuitry and the second-device-side circuitry and adapted to provide electrical isolation between the first device and the second device, wherein the first-device-side circuitry and the second-device-side circuitry are adapted to apply sigma-delta modulation techniques to generate digital signals for transmission through the digital interface, and the digital interface has three couplers connected between the first-device-side circuitry and the second-device-side circuitry and providing electrical isolation between the first and second devices, wherein all three couplers in the digital interface are capacitive couplers, wherein the digital interface has two high-voltage capacitive couplers for the transmit path (one for outgoing data signals and one for clock signals) and one high-voltage capacitive coupler for the receive path (for incoming data signals), wherein:

the digital signals transmitted through the digital interface are 1-bit signals;

the second-device-side circuitry is at least partially powered by a transmission line of the second device:

the second-device-side circuitry comprises:
(1) a D/A converter, adapted to convert outgoing digital sigma-delta signals into outgoing analog signals;
(2) an A/D converter, adapted to convert incoming analog signals into incoming digital sigma-delta signals;
(3) an AC termination impedance, adapted to provide impedance for transmission-line AC requirements;
(4) an inductor emulator, adapted to provide DC termination for the transmission line of the second device;
(5) a shunt regulator, adapted to control voltage levels seen by the second-device-side circuitry, wherein the inductor emulator is connected in series with the shunt regulator;
(6) a hybrid, adapted to sample transmission-line signals and the outgoing analog signals to generate a replica of the incoming analog signals; and
(7) a polarity guard, adapted to ensure that correct polarity DC voltage is applied to the second-device-side circuitry.

2. The invention of claim 1, wherein:

the first device is a portable digital device;

the interface device is a modem; and the first-device-side circuitry has a codec digital processor adapted to perform the first-device-side codec processing, and the second-device-side circuitry has codec analog front end circuitry adapted to perform the second-device-side codec processing.

3. Analog front end (AFE) circuitry for an interface device for interfacing between a first device and a second device, wherein:

the AFE circuitry forms second-device-side circuitry of the interface device which is adapted to interface to the second device and to provide second-device-side codec processing; and the interface device further comprises:
first-device-side circuitry, adapted to interface to the first device and to provide first-device-side codec processing; and
a digital interface, connected between the first-device-side circuitry and the second-device-side circuitry and adapted to provide electrical isolation between the first device and the second device, wherein the first-device-side circuitry and the second-device-side circuitry are adapted to apply sigma-delta modulation techniques to generate digital signals for transmission through the digital interface, and the digital interface has three couplers connected between the first-device-side circuitry and the second-device-side circuitry and providing electrical isolation between the first and second devices, wherein all three couplers in the digital interface are capacitive couplers, wherein the digital interface has two high-voltage capacitive couplers for the transmit path (one for outgoing data signals and one for clock signals) and one high-voltage capacitive coupler for the receive path (for incoming data signals), wherein:
the digital signals transmitted through the digital interface are 1-bit signals;
the second-device-side circuitry is at least partially powered by a transmission line of the second device;

the second-device-side circuitry comprises:
(1) a D/A converter adapted to convert outgoing digital sigma-delta signals into outgoing analog signals;
(2) an A/D converter, adapted to convert incoming analog signals into incoming digital sigma-delta signals;
(3) an AC termination impedance adapted to provide impedance for transmission-line AC requirements;
(4) an inductor emulator, adapted to provide DC termination for the transmission line of the second device;
(5) a shunt regulator, adapted to control voltage levels seen by the second-device-side circuitry, wherein the inductor emulator is connected in series with the shunt regulator;
(6) a hybrid, adapted to sample transmission-line signals and the outgoing analog signals to generate a replica of the incoming analog signals; and
(7) a polarity guard, adapted to ensure that correct polarity DC voltage is applied to the second-device-side circuitry.

4. The invention of claim 3, wherein:

the first device is a portable digital device;

the interface device is a modem; and the first-device-side circuitry has a codec digital processor adapted to perform the first-device-side codec processing, and the second-device-side circuitry has codec analog front end circuitry adapted to perform the second-device-side codec processing.

5. An interface device for interfacing between a first device and a second device, comprising:
(a) first-device-side circuitry, adapted to interface to the first device and to provide first-device-side codec processing;
(b) second-device-side circuitry, adapted to interface to the second device and to provide second-device-side codec processing; and
(c) a digital interface, connected between the first-device-side circuitry and the second-device-side circuitry and adapted to provide electrical isolation between the first device and the second device, wherein:
the first-device-side circuitry and the second-device-side circuit are adapted to apply sigma-delta modulation techniques to generate digital signals for transmission through the digital interface;
the digital interface comprises one or more optical couplers, each optical coupler comprising an optical transmitter and an optical detector; and
each optical coupler in the transmit path comprises a first-device-side optical transmitter and a second-device-side optical detector, the second-device-side optical detector having a photo-diode, an amplifier, and biasing circuitry adapted to reverse bias the photo-diode.

6. The invention of claim 5, wherein each optical coupler in the receive path comprises a second-device-side optical transmitter and a first-device-side optical detector, the second-device-side optical transmitter having a light-emitting diode (LED) and biasing circuitry adapted to bias the LED idling on.

7. An interface device for interfacing between a first device and a second device, comprising:
(a) first-device-side circuitry, adapted to interface to the first device and to provide first-device-side codec processing;

(b) second-device-side circuitry, adapted to interface to the second device and to provide second-device-side codec processing; and (c) a digital interface, connected between the first-device-side circuitry and the second-device-side circuitry and adapted to provide electrical isolation between the first device and the second device, wherein:

the first-device-side circuitry and the second-device-side circuitry are adapted to apply sigma-delta modulation techniques to generate digital signals for transmission through the digital interface;

the digital interface comprises one or more optical couplers, each optical coupler comprising an optical transmitter and an optical detector; and each optical coupler in the receive path comprises a second-device-side optical transmitter and a first-device-side optical detector, the second-device-side optical transmitter having a light-emitting diode (LED) and biasing circuitry adapted to bias the LED idling on.

8. Analog front end (AFE) circuitry for an interface device for interfacing between a first device and a second device, wherein:

the AFE circuitry forms second-device-side circuitry of the interface device which is adapted to interface to the second device and to provide second-device-side codec processing; and the interface device further comprises:

first-device-side circuitry, adapted to interface to the first device and to provide first-device-side codec processing; and a digital interface, connected between the first-device-side circuitry and the second-device-side circuitry and adapted to provide electrical isolation between the first device and the second device, wherein:

the first-device-side circuitry and the second-device-side circuitry are adapted to apply sigma-delta modulation techniques to generate digital signals for transmission through the digital interface;

the digital interface comprises one or more optical couplers, each optical coupler comprising an optical transmitter and an optical detector; and each optical coupler in the transmit path comprises a first-device-side optical transmitter and a second-device-side optical detector, the second-device-side optical detector having a photo-diode, an amplifier, and biasing circuitry adapted to reverse bias the photo-diode.

9. The invention of claim 8, wherein each optical coupler in the receive path comprises a second-device-side optical transmitter and a first-device-side optical detector, the second-device-side optical transmitter having a light-emitting diode (LED) and biasing circuitry adapted to bias the LED idling on.

10. Analog front end (AFE) circuitry for an interface device for interfacing between a first device and a second device, wherein:

the AFE circuitry forms second-device-side circuitry of the interface device which is adapted to interface to the second device and to provide second-device-side codec processing; and the interface device further comprises:

first-device-side circuitry, adapted to interface to the first device and to provide first-device-side codec processing; and a digital interface, connected between the first-device-side circuitry and the second-device-side circuitry and adapted to provide electrical isolation between the first device and the second device, wherein:

the first-device-side circuitry and the second-device-side circuitry are adapted to apply sigma-delta modulation techniques to generate digital signals for transmission through the digital interface;

the digital interface comprises one or more optical couplers, each optical coupler comprising an optical transmitter and an optical detector; and each optical coupler in the receive path comprises a second-device-side optical transmitter and a first-device-side optical detector, the second-device-side optical transmitter having a light-emitting diode (LED) and biasing circuitry adapted to bias the LED idling on.

11. An interface device for interfacing between a first device and a second device, comprising:

(a) first-device-side circuitry, adapted to interface to the first device;

(b) second-device-side circuitry, adapted to interface to the second device and to the first-device-side circuitry, wherein the second-device-side circuitry comprises:

(1) an AC termination impedance, adapted to provide impedance for transmission-line AC requirements;

(2) an inductor emulator, adapted to provide DC termination for the second device; and (3) a shunt regulator, adapted to control voltage levels seen by the second-device-side circuitry, wherein the inductor emulator is connected in series with the shunt regulator; and (c) a digital interface, connected between the first-device-side circuitry and the second-device-side circuitry and adapted to provide electrical isolation between the first device and the second device, wherein:

the first-device-side circuitry is further adapted to provide first-device-side codec processing;

the second-device-side circuitry is further adapted to provide second-device-side codec processing;

the second-device-side circuitry further comprises:

(4) a D/A converter, adapted to convert outgoing digital signals into the outgoing analog signals; and (5) an A/D converter, adapted to convert incoming analog signals into incoming digital signals;

the digital interface comprises one or more optical couplers, each optical coupler comprising an optical transmitter and an optical detector; and each optical coupler in the transmit path comprises a first-device-side optical transmitter and a second-device-side optical detector, the second-device-side optical detector having a photo-diode, an amplifier, and biasing circuitry adapted to reverse bias the photo-diode.

12. The invention of claim 11, wherein each optical coupler in the receive path comprises a second-device-side optical transmitter and a first-device-side optical detector, the second-device-side optical transmitter having a light-emitting diode (LED) and biasing circuitry adapted to bias the LED idling on.

13. An interface device for interfacing between a first device and a second device, comprising:

(a) first-device-side circuitry, adapted to interface to the first device;

(b) second-device-side circuitry, adapted to interface to the second device and to the first-device-side circuitry, wherein the second-device-side circuitry comprises:

(1) an AC termination impedance, adapted to provide impedance for transmission-line AC requirements;
(2) an inductor emulator, adapted to provide DC termination for the second device; and
(3) a shunt regulator, adapted to control voltage levels seen by the second-device-side circuitry, wherein the inductor emulator is connected in series with the shunt regulator; and (c) a digital interface, connected between the first-device-side circuitry and the second-device-side circuitry and adapted to provide electrical isolation between the first device and the second device, wherein:
the first-device-side circuitry is further adapted to provide first-device-side codec processing;
the second-device-side circuitry is further adapted to provide second-device-side codec processing;
the second-device-side circuitry further comprises:
(4) a D/A converter, adapted to convert outgoing digital signals into the outgoing analog signals; and
(5) an A/D converter, adapted to convert incoming analog signals into incoming digital signals;
the digital interface comprises one or more optical couplers, each optical coupler comprising an optical transmitter and an optical detector; and
each optical coupler in the receive path comprises a second-device-side optical transmitter and a first-device-side optical detector, the second-device-side optical transmitter having a light-emitting diode (LED) and biasing circuitry adapted to bias the LED idling on.

14. Analog front end (AFE) circuitry for an interface device for interfacing between a first device and a second device, comprising:
(1) an AC termination impedance, adapted to provide impedance for transmission-line AC requirements;
(2) an inductor emulator, adapted to provide DC termination for the second device; and
(3) a shunt regulator, adapted to control voltage levels seen by the AFE circuitry, wherein the inductor emulator is connected in series with the shunt regulator, wherein:
the AFE circuitry is adapted to apply sigma-delta modulation techniques to generate digital signals for transmission through a digital interface of the digital interface;
the digital interface comprises one or more optical couplers, each optical coupler comprising an optical transmitter and an optical detector; and
each optical coupler in the transmit path comprises a first-device-side optical transmitter and a second-device-side optical detector, the second-device-side optical detector having a photo-diode, an amplifier, and biasing circuitry adapted to reverse bias the photo-diode.

15. The invention of claim 14, wherein each optical coupler in the receive path comprises a second-device-side optical transmitter and a first-device-side optical detector, the second-device-side optical transmitter having a light-emitting diode (LED) and biasing circuitry adapted to bias the LED idling on.

16. Analog front end (AFE) circuitry for an interface device for interfacing between a first device and a second device, comprising:
(1) an AC termination impedance, adapted to provide impedance for transmission-line AC requirements;
(2) an inductor emulator, adapted to provide DC termination for the second device; and
(3) a shunt regulator, adapted to control voltage levels seen by the AFE circuitry, wherein the inductor emulator is connected in series with the shunt regulator, wherein:
the AFE circuitry is adapted to apply sigma-delta modulation techniques to generate digital signals for transmission through a digital interface of the digital interface;
the digital interface comprises one or more optical couplers, each optical coupler comprising an optical transmitter and an optical detector; and
each optical coupler in the receive path comprises a second-device-side optical transmitter and a first-device-side optical detector, the second-device-side optical transmitter having a light-emitting diode (LED) and biasing circuitry adapted to bias the LED idling on.

17. An interface device for interfacing between a first device and a second device, comprising:
(a) first-device-side circuitry, adapted to interface to the first device and to provide first-device-side codec processing;
(b) second-device-side circuitry, adapted to interface to the second device and to provide second-device-side codec processing; and
(c) a digital interface, connected between the first-device-side circuitry and the second-device-side circuitry and adapted to provide electrical isolation between the first device and the second device, wherein:
the first-device-side circuitry and the second-device-side circuitry are adapted to apply sigma-delta modulation techniques to generate digital signals for transmission through the digital interface;
the digital signals transmitted through the digital interface are 1-bit signals;
the digital interface has two high-voltage couplers for the transmit path (one for outgoing data signals and one for clock signals) and one high-voltage coupler for the receive path (for incoming data signals);
the second-device-side circuitry is powered solely by a transmission line of the second device; and
the second-device-side circuitry comprises:
(1) a D/A converter, adapted to convert outgoing digital sigma-delta signals into outgoing analog signals;
(2) an A/D converter, adapted to convert incoming analog signals into incoming digital sigma-delta signals;
(3) an AC termination impedance, adapted to provide impedance for transmission-line AC requirements;
(4) an inductor emulator, adapted to provide DC termination for the transmission line of the second device;
(5) a shunt regulator, adapted to control voltage levels seen by the second-device-side circuitry, wherein the inductor emulator is connected in series with the shunt regulator;
(6) a hybrid, adapted to sample transmission-line signals and the outgoing analog signals to generate a replica of the incoming analog signals; and
(7) a polarity guard, adapted to ensure that correct polarity DC voltage is applied to the second-device-side circuitry.

18. The invention of claim 17, wherein:
the first device is a portable digital device;
the interface device is a modem;
the first-device-side circuitry has a codec digital processor adapted to perform the first-device-side codec processing, and the second-device-side circuitry has codec analog front end circuitry adapted to perform the second-device-side codec processing; and the digital interface comprises one or more optical couplers, each optical coupler comprising an optical transmitter and an optical detector, wherein:

each optical coupler in the transmit path comprises a first-device-side optical transmitter and a second-device-side optical detector, the second-device-side optical detector having a photo-diode, an amplifier, and biasing circuitry adapted to reverse bias the photo-diode; and each optical coupler in the receive path comprises a second-device-side optical transmitter and a first-device-side optical detector, the second-device-side optical transmitter having a light-emitting diode (LED) and biasing circuitry adapted to bias the LED idling on.

19. Analog front end (AFE) circuitry for an interface device for interfacing between a first device and a second device, wherein:

the AFE circuitry forms second-device-side circuitry of the interface device which is adapted to interface to the second device and to provide second-device-side codec processing; and the interface device further comprises:

first-device-side circuitry, adapted to interface to the first device and to provide first-device-side codec processing; and a digital interface, connected between the first-device-side circuitry and the second-device-side circuitry and adapted to provide electrical isolation between the first device and the second device, wherein:

the first-device-side circuitry and the second-device-side circuitry are adapted to apply sigma-delta modulation techniques to generate digital signals for transmission through the digital interface;

the digital signals transmitted through the digital interface are 1-bit signals;

the digital interface has two high-voltage couplers for the transmit path (one for outgoing data signals and one for clock signals) and one high-voltage coupler for the receive path (for incoming data signals);

the second-device-side circuitry is powered solely by a transmission line of the second device; and the second-device-side circuitry comprises:

(1) a D/A converter, adapted to convert outgoing digital sigma-delta signals into outgoing analog signals;

(2) an A/D converter, adapted to convert incoming analog signals into incoming digital sigma-delta signals;

(3) an AC termination impedance, adapted to provide impedance for transmission-line AC requirements;

(4) an inductor emulator, adapted to provide DC termination for the transmission line of the second device;

(5) a shunt regulator, adapted to control voltage levels seen by the second-device-side circuitry, wherein the inductor emulator is connected in series with the shunt regulator;

(6) a hybrid, adapted to sample transmission-line signals and the outgoing analog signals to generate a replica of the incoming analog signals; and (7) a polarity guard, adapted to ensure that correct polarity DC voltage is applied to the second-device-side circuitry.

20. The invention of claim 19, wherein:

the first device is a portable digital device;

the interface device is a modem;

the first-device-side circuitry has a codec digital processor adapted to perform the first-device-side codec processing, and the second-device-side circuitry has codec analog front end circuitry adapted to perform the second-device-side codec processing; and the digital interface comprises one or more optical couplers, each optical coupler comprising an optical transmitter and an optical detector, wherein:

each optical coupler in the transmit path comprises a first-device-side optical transmitter and a second-device-side optical detector, the second-device-side optical detector having a photo-diode, an amplifier, and biasing circuitry adapted to reverse bias the photo-diode; and each optical coupler in the receive path comprises a second-device-side optical transmitter and a first-device-side optical detector, the second-device-side optical transmitter having a light-emitting diode (LED) and biasing circuitry adapted to bias the LED idling on.

21. An interface device for interfacing between a first device and a second device, comprising:

(a) first-device-side circuitry, adapted to interface to the first device;

(b) second-device-side circuitry, adapted to interface to the second device; and (c) an interface, connected between the first-device-side circuitry and the second-device-side circuitry and adapted to provide electrical isolation between the first device and the second device, wherein:

the first-device-side circuitry and the second-device-side circuitry are adapted to apply modulation techniques to generate digital signals for transmission through the interface;

the digital signals transmitted through the interface are n-bit signals, wherein n is a positive integer;

the interface has two or more high-voltage couplers for the transmit and receive paths;

the second-device-side circuitry comprises:

(1) a D/A converter, adapted to convert outgoing digital signals into outgoing analog signals;

(2) an A/D converter, adapted to convert incoming analog signals into incoming digital signals;

(3) an AC termination impedance, adapted to provide impedance for transmission-line AC requirements;

(4) an inductor emulator, adapted to provide DC termination for the transmission line of the second device;

(5) a shunt regulator, adapted to control voltage levels seen by the second-device-side circuitry, wherein the inductor emulator is connected with the shunt regulator; and (6) a polarity guard, adapted to ensure that correct polarity DC voltage is applied to the second-device-side circuitry; and the interface device comprises a hybrid, adapted to sample transmission-line signals and the outgoing analog signals to generate a replica of the incoming analog signals.

22. The invention of claim 21, wherein:

the interface is a digital interface;

the modulation is sigma-delta modulation;

n is 1;

the second-device-side circuitry is at least partially powered by a transmission line of the second device; and the hybrid is part of the second-device-side circuitry.

23. The invention of claim 21, wherein the interface has two high-voltage couplers for the transmit path (one for outgoing data signals and one for clock signals) and one high-voltage coupler for the receive path (for incoming data signals).

24. The invention of claim 21, wherein the inductor emulator is connected in series with the shunt regulator.

25. The invention of claim 21, wherein:

the first device is a portable digital device;

the interface device is a modem;

the first-device-side circuitry has a codec digital processor adapted to perform first-device-side codec processing, and the second-device-side circuitry has codec analog front end circuitry adapted to perform second-device-side codec processing.

26. The invention of claim 21, wherein the digital interface comprises one or more optical couplers, each optical coupler comprising an optical transmitter and an optical detector, wherein:

each optical coupler in the transmit path comprises a first-device-side optical transmitter and a second-device-side optical detector, the second-device-side optical detector having a photo-diode, an amplifier, and biasing circuitry adapted to reverse bias the photo-diode; and each optical coupler in the receive path comprises a second-device-side optical transmitter and a first-device-side optical detector, the second-device-side optical transmitter having a light-emitting diode (LED) and biasing circuitry adapted to bias the LED idling on.

27. Analog front end (AFE) circuitry for an interface device for interfacing between a first device and a second device, wherein:

the AFE circuitry forms second-device-side circuitry of the interface device which is adapted to interface to the second device; and the interface device further comprises:

first-device-side circuitry, adapted to interface to the first device; and an interface, connected between the first-device-side circuitry and the second-device-side circuitry and adapted to provide electrical isolation between the first device and the second device, wherein:

the first-device-side circuitry and the second-device-side circuitry are adapted to apply modulation techniques to generate digital signals for transmission through the interface;

the digital signals transmitted through the interface are n-bit signals, wherein n is a positive integer;

the interface has two or more high-voltage couplers for the transmit and receive paths;

the second-device-side circuitry comprises:

(1) a D/A converter, adapted to convert outgoing digital signals into outgoing analog signals;

(2) an A/D converter, adapted to convert incoming analog signals into incoming digital signals;

(3) an AC termination impedance, adapted to provide impedance for transmission-line AC requirements;

(4) an inductor emulator, adapted to provide DC termination for the transmission line of the second device;

(5) a shunt regulator, adapted to control voltage levels seen by the second-device-side circuitry, wherein the inductor emulator is connected with the shunt regulator; and (6) a polarity guard, adapted to ensure that correct polarity DC voltage is applied to the second-device-side circuitry; and the interface device comprises a hybrid, adapted to sample transmission-line signals and the outgoing analog signals to generate a replica of the incoming analog signals.

28. The invention of claim 27, wherein:

the interface is a digital interface;

the modulation is sigma-delta modulation;

n is 1;

the second-device-side circuitry is at least partially powered by a transmission line of the second device; and the hybrid is part of the second-device-side circuitry.

29. The invention of claim 27, wherein the interface has two high-voltage couplers for the transmit path (one for outgoing data signals and one for clock signals) and one high-voltage coupler for the receive path (for incoming data signals).

30. The invention of claim 27, wherein the inductor emulator is connected in series with the shunt regulator.

31. The invention of claim 27, wherein:

the first device is a portable digital device;

the interface device is a modem;

the first-device-side circuitry has a codec digital processor adapted to perform first-device-side codec processing, and the second-device-side circuitry has codec analog front end circuitry adapted to perform second-device-side codec processing.

32. The invention of claim 27, wherein the digital interface comprises one or more optical couplers, each optical coupler comprising an optical transmitter and an optical detector, wherein:

each optical coupler in the transmit path comprises a first-device-side optical transmitter and a second-device-side optical detector, the second-device-side optical detector having a photo-diode, an amplifier, and biasing circuitry adapted to reverse bias the photo-diode; and each optical coupler in the receive path comprises a second-device-side optical transmitter and a first-device-side optical detector, the second-device-side optical transmitter having a light-emitting diode (LED) and biasing circuitry adapted to bias the LED idling on.

* * * * *

UNITED STATES PATENT AND TRADEMARK OFFICE
CERTIFICATE OF CORRECTION

PATENT NO.   : 6,169,762 B1
DATED        : January 2, 2001
INVENTOR(S)  : Milton L. Embree, Jonathan H. Fischer, Donald R. Laturell, and Robert F. Lee It is certified that error appears in the above-identified patent and that said Letters Patent is hereby corrected as shown below:

<u>Title page,</u>
Item [56], Reference Cited 4,056,719, replace "Hizel" with -- Waaben --.

Signed and Sealed this

Twenty-fifth Day of December, 2001

Attest:

Attesting Officer

JAMES E. ROGAN
*Director of the United States Patent and Trademark Office*